United States Patent [19]

Hughes et al.

[11] 3,813,493

[45] May 28, 1974

[54] SECURE DATA TRANSMISSION APPARATUS

[76] Inventors: Patrick A. Hughes, 3750 N.W. 11st St., Pompano Beach, Fla. 33063; David S. Russell, 891 N.W. 49th Ave., Fort Lauderdale, Fla. 33313

[22] Filed: Dec. 7, 1972

[21] Appl. No.: 313,149

[52] U.S. Cl. ................. 179/1.5 S, 178/5.1, 178/22, 179/1.5 R

[51] Int. Cl. .......................... H04n 1/44, H04k 1/02

[58] Field of Search ............. 178/22, 5.1; 179/1.5 R

[56] References Cited

UNITED STATES PATENTS

| | | | |
|---|---|---|---|
| 3,291,908 | 12/1966 | Ehrat | 178/22 |
| 3,341,659 | 9/1967 | Stern | 179/1.5 R |
| 3,384,705 | 5/1968 | Rosen | 178/5.1 |
| 3,427,399 | 2/1969 | Ehrat | 178/22 |
| 3,651,261 | 3/1972 | Guanella | 178/22 |
| 3,711,645 | 1/1973 | Ehrat | 178/22 |

*Primary Examiner*—T. H. Tubbesing
*Assistant Examiner*—H. A. Birmiel
*Attorney, Agent, or Firm*—Oltman and Flynn

[57] ABSTRACT

Apparatus for enciphering data to provide secure transmission including generating a stream of random signals for combining with the data to provide scrambled data signals. An intermediate sequence is provided to limit the magnitude of the change between successive random signals.

6 Claims, 5 Drawing Figures

SECURE DATA TRANSMISSION APPARATUS

BACKGROUND OF THE INVENTION

1. Field of the Invention

This invention relates in general to apparatus for enciphering or scrambling data to provide secure transmission and reception. This invention finds utility in all types of communications systems and has a particular utility in the field of facsimile transmission.

2. Description of the Prior Art

Data transmission and communication systems, including those for the transmission of facsimiles, are, of course, well-known. It is also known that an unauthorized person may receive the data being transmitted. Thus, apparatus has been developed for providing secure or scrambled data transmission.

There are, however, various problems still encountered when utilizing prior technology. For example, some frequency shifting techniques actually change the characteristic of the data being transmitted. This change in signal characteristics causes innumerable problems in the unscrambling or decoding of the data at the receiving station.

While it is desired to provide some random sequence for scrambling the data, a true random generator also may provide a sequence of random signals which materially distorts the input signal because of the very nature of a random signal generator.

SUMMARY OF THE INVENTION

In view of the problems of the prior art, as well as other problems which have been encountered by those skilled in the art, it is an object of the present invention to overcome these problems by providing a new and improved data transmission and communication system.

It is a further object of the present invention to limit the magnitude of the random signals and limit the magnitude of the change between successive random signals, which are utilized in scrambling data.

It is a further object of the present invention to utilize multiple streams of random numerals to control the overall scrambling of the input data signal.

BRIEF DESCRIPTION OF THE DRAWINGS

The foregoing advantages of the present invention, together with other advantages which may be attained by its use, will become apparent upon reading the following detailed description taken in conjunction with the drawings. In the drawings, wherein like numerals represent corresponding circuit parts.

DETAILED DESCRIPTION OF THE INVENTION

Figure 1:
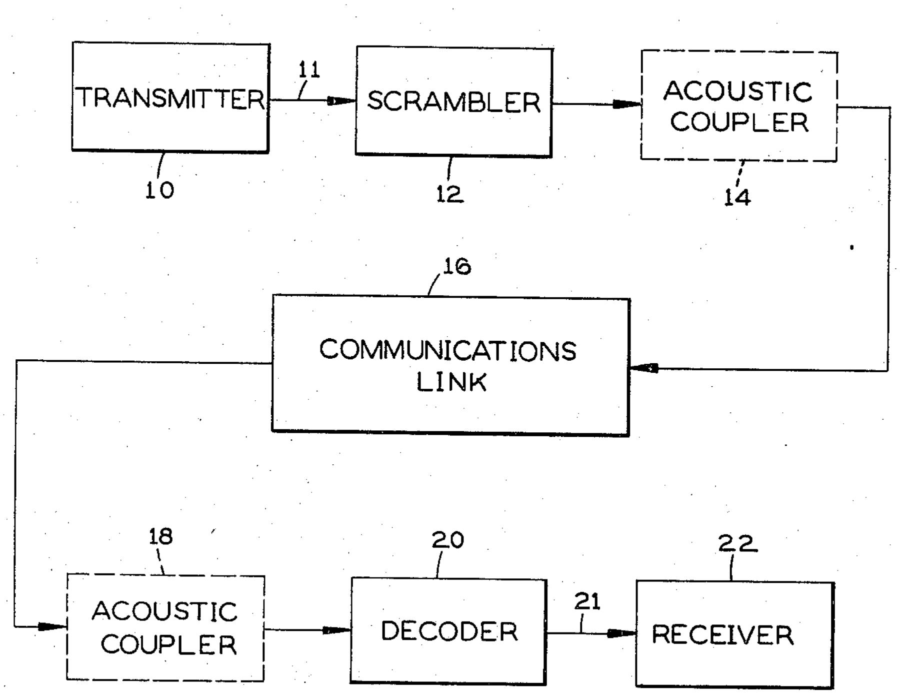
FIG. 1 is a block diagram of a data communication system for secure transmission and reception of data.

Referring first to FIG. 1, it is assumed for the purpose of this description that the communication link or channel would be a conventional telephone circuit. In this case, a typical communication system would include a transmitter 10 having an output 11, a scrambling device 12 for encoding the output 11 of the transmitter, and an acoustic coupler 14 for converting the scrambled data into signals for transmission along a communications link 16. At the receiving end of the communications link is, in the reverse order from the transmitting end, an acoustic coupler 18, a decoder 20 having an output 21 and a receiving unit 22.

It must be appreciated that if a telephone circuit is not used as the communications medium, then the necessity for acoustic couplers 14 and 18 may be obviated. For example, if it is desired to transmit over radio frequencies and via communications satellites then only transmitters, receivers and associated scrambling devices will be necessary. It must further be appreciated that if it is desired to utilize facsimile transmissions, the scrambling or encoding techniques of the present invention may be utilized along with conventional equipment such as that manufactured by the Xerox Corporation. In this event the output of the facsimile equipment will be considered as equivalent to the output of the transmitter.

In order to more properly explain the scrambling technique, it should be recalled that any electronic signal of a constant amplitude which is modulated in some fashion results in a signal which has various transitions or reversals occurring as a function of time. If the amplitude itself is limited to one of two values, the result is a binary data signal which conveys information essentially by the positions of these transitions relative to time. The particular pattern of successive reversals both by time and direction conveys the information. Thus, it may be appreciated that in order to scramble or encode information of this type both the sequences of the reversals and the duration of the signals between reversals may be changed. Obviously, in order to decipher the scrambled signal the process of scrambling must be so controlled as to permit its reverse use in decoding.

Figure 2:
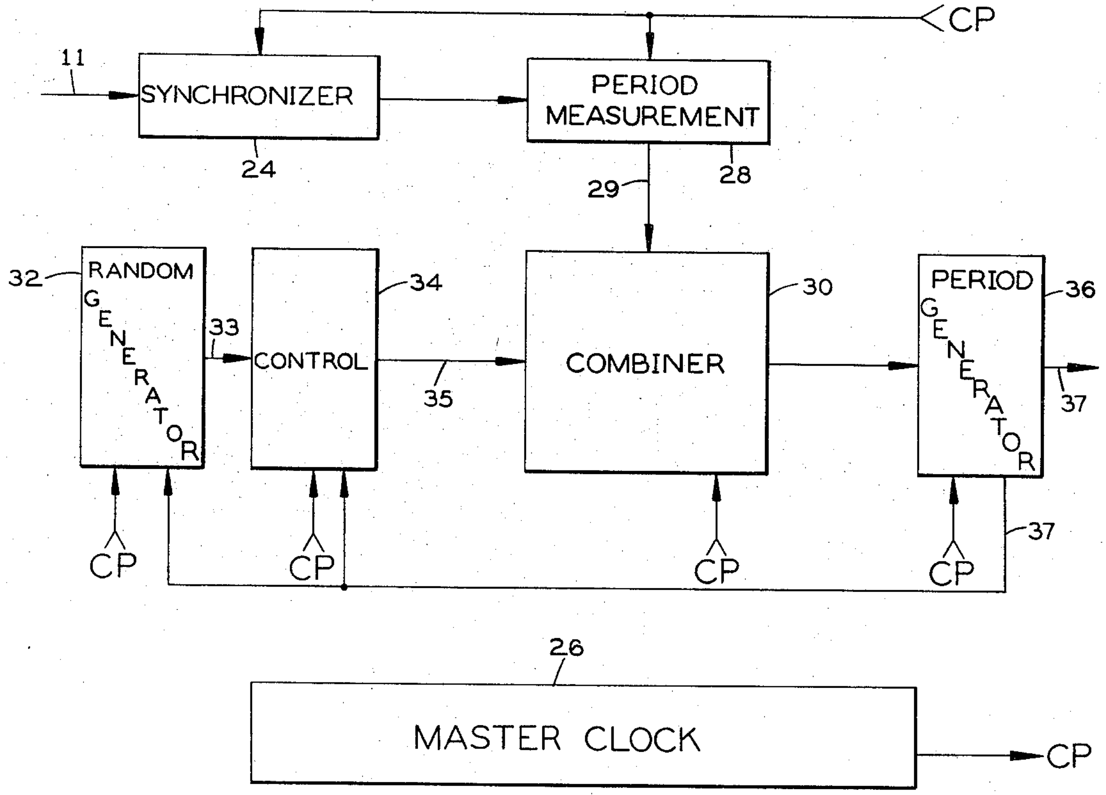
FIG. 2 is a block diagram of the circuit for scrambling the data according to the principles of the present invention.

The circuit which provides the scrambling at the transmitting end is shown in FIG. 2. The scrambler of FIG. 2 has, as one input, the output 11 of the data transmitter 10 of FIG. 1. A synchronizer control means 24 receives clock pulses CP from a master clock or pulse generator 26 to synchronize the signal 11.

The conventional operation of the synchronizer control means 24 modifies the input signal 11 so that the signal transitions or reversals occur in sync (simultaneously) with the transitions or reversals of clock pulses from the master clock 26. These synchronized signals serve as one input to a period measurement means 28 with the other input being clock pulses CP. The period measurement means measures the time interval, in microseconds, between each signal reversal or transition and produces an output 29 which is a scalar number proportional to the number of clock pulses occurring between successive signal reversals. This output 29 changes each time there is a new input signal reversal. For ease of handling, as will be explained hereinafter, it is preferred that the output 29 be a binary coded decimal representation in parallel form.

The output 29 serves as one input to a combining means 30 which, in the preferred mode of operation, will be a parallel, multi-bit adder. Also included in the scrambler are a random generator 32 having an output 33 and random generator control means 34, responsive to the output 33 to provide an output 35 which is another input to the combiner 30.

The output of the combiner 30 serves as the input to a period generator 36 which provides an output string of ones and zeros with the time between the transitions being controlled by the numerical value of the output of the combining means itself. Thus the period generator operates asynchronously with respect to changes in the value of the combining means. By way of explanation, after each transition in the output of the period generator, the period generator itslf samples the numerical value of the output of the combining means 30. This value, operates to delay the period generator output from changing for a certain time. The time delay, in microseconds, is equal to the numerical value of the output of the combiner. At the end of this time delay, the period generator 36 provides an output transition and again samples the numerical value of the combiner 30. It is appreciated that this value may be the same and/or may have changed several times in the interim with all the intermediate changes being disregarded because of the delay. It is only the value of the output of the combiner 30 at the time it is sampled, i.e., at each transition of the period generator 36, which is utilized to asynchronously control the next output of the period generator.

In the explanation of this invention, the term "random" will be utilized although it must be appreciated that the "random" generator 32 does not generate purely random numbers in the mathematical sense. This is because the physical size of the random generator 36 provides a cyclic limit to the number of random sequences of ones and zeros which may be possibly generated.

Thus the purpose of the random generator 32 and its control means 34 is to generate a pseudo-random or relatively random sequence of numbers to be used as one weighted input to the combiner 30.

It is well-known in the data transmission technologies that the transmitter and the receiver must be exactly in sequence relative to a signal transmitted and received. In this manner, the random generators are automatically synchronized by data bits, i.e., the random generators are clocked on the same signal transition or reversal. Clearly then, when they both start from the same point in time, commonly called frame synchronization, they will both advance and maintain synchronization.

Figure 3:
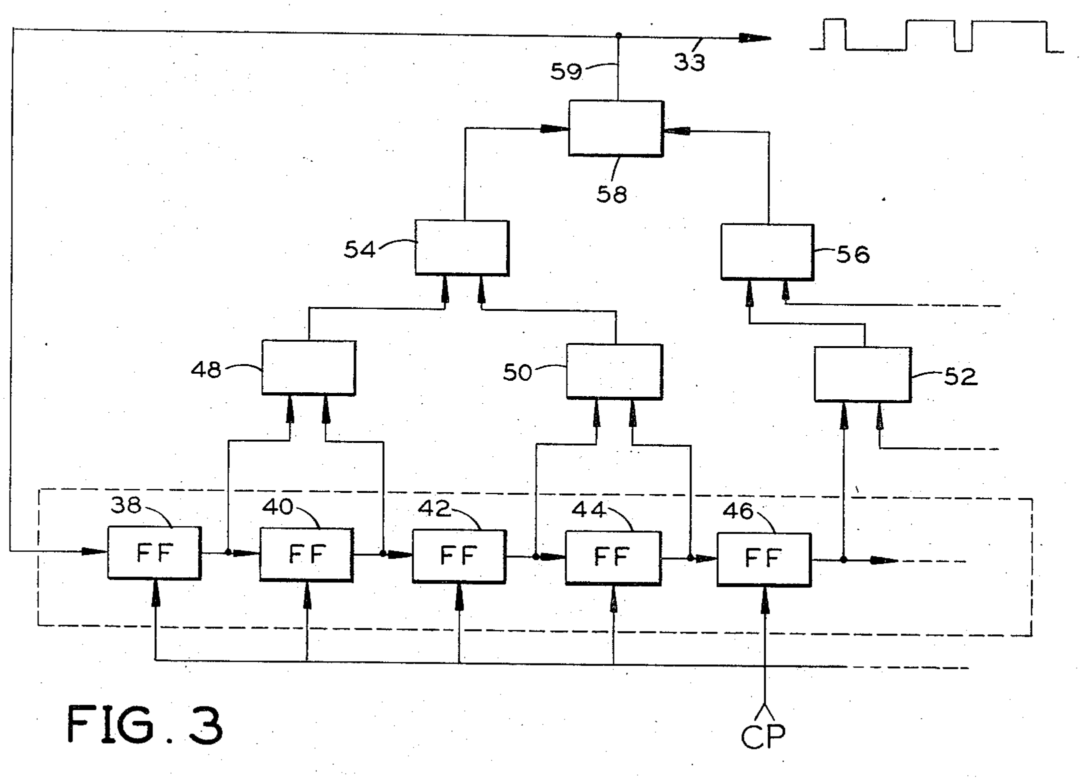
FIG. 3 is a schematic circuit diagram, in block form, of a random generator according to the principles of the present invention.

With reference now to FIG. 3, there is illustrated the random generator 32 in detail. A plurality of memory elements such as flip-flops 38, 40, 42, 44 and 46 are connected in serial fashion to form a shift register. A feedback network consisting of a pyramid of feedback elements (exclusive or logic function) 48, 50, 52, 54, 56, 58, has its outputs 59 from the top element coupled back to the input of the first flip-flop 38 to form a feedback loop. Inputs to the feedback pyramid in the base of the pyramid are taken from between selected shift register stages. As the shift register is clocked or shifted by each clocking signal 37, a serial bit stream sequence, consisting of a random number of logic ones and zeros, is generated at output 59. The length of the sequence, measured in number of clock pulses prior to repetition, is dependent upon (a) the number of flip-flops in the shift register and (b) the number of feedback array utilized. The particular number of feedback element inputs and their location establishes a unique code for the scrambler. In practice, for an N bit shift register, the maximum number of clock pulses prior to a sequence repeat is $2^n-1$. Similarly, the number of possible maximum length sequences based upon the arrangement of feedback elements is also $2^n-1$. Thus, it is clear that a large family of enciphering devices can be built each having a different code.

In the use of a random or pseudo-random generator, as shown in FIG. 3, either a parallel or a serial output bit stream may be utilized. The serial bit stream, of course, is available at the output 59 of the pyramid. Also, it may be taken at any point along the shift register stages. To provide a parallel random sequence a plurality of taps on the shift register stages may be utilized. These taps will, in fact, correspond to various possible inputs to the base level of binary half adders in the pyramid.

Figure 4:
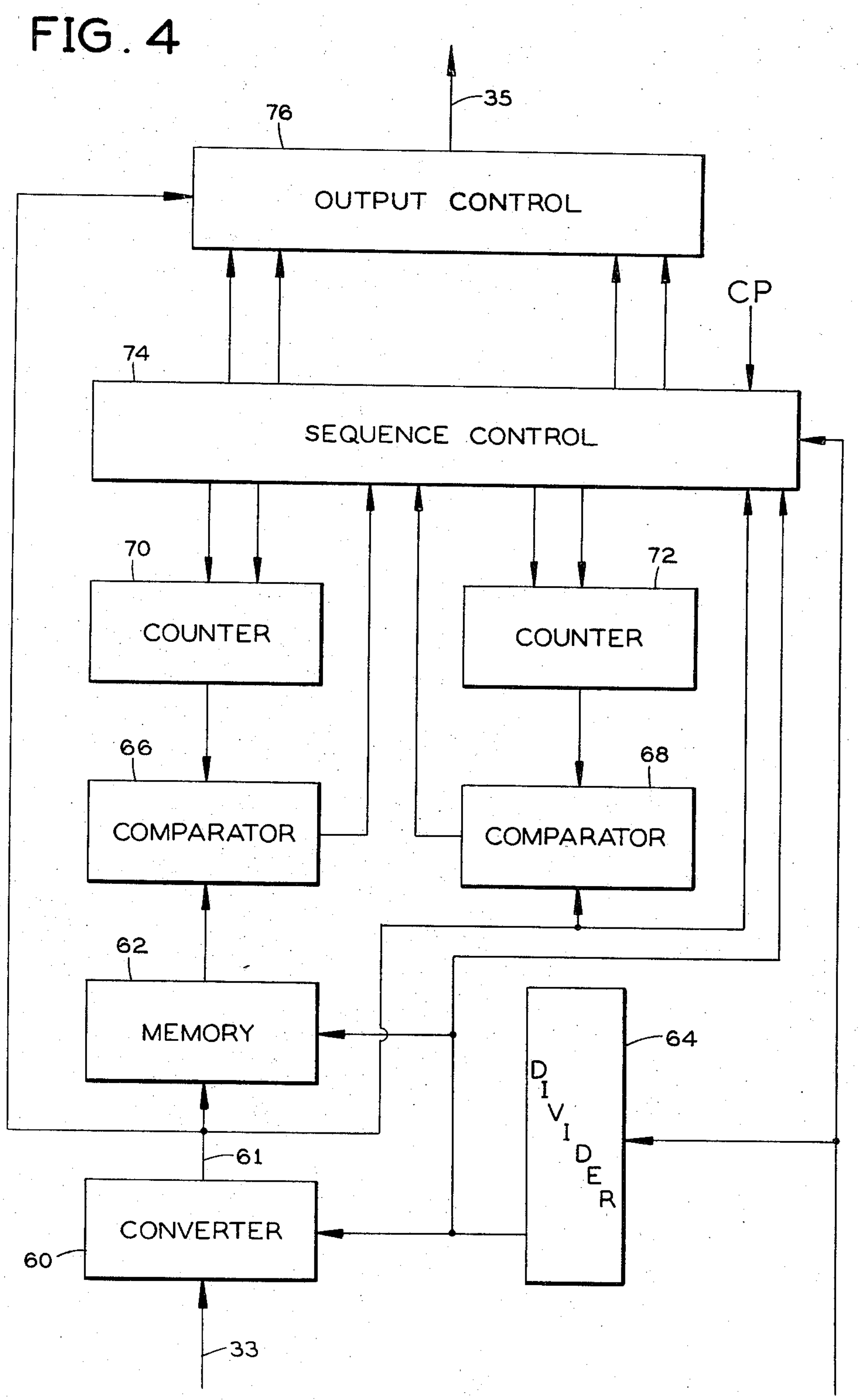
FIG. 4 is a schematic block diagram of the control means for limiting the random signals according to the principles of the present invention.

In the preferred mode of operation, a serial bit stream output from the random generator is taken from the top of the binary half adder pyramid and utilized as the input 33 to the control means 34. The control means 34 of FIG. 2 shown in detail in FIG. 4 includes means 60 to convert the serial bit stream 33, taken from the top of the binary half adder pyramid, into a parallel bit stream of binary coded decimal numbers. Theoretically, the range of possible numerical values of the parallel number 61 is quite large and the largest possible change between successive values is as large as the maximum numerical value itself. The control means 34 of FIG. 2 eliminates this possibility by generation of an intermediate sequence of random numbers derived from numbers generated by the random generator 32 as hereinafter described. The converter output 61, which will be referred to as the primary output sequence, functions to limit the output 35 of the control means.

At any point in time in the operation of the control means 34, there is a "new" primary sequence which has just been converted by the converter 60 and an "old" primary sequence which is the immediately preceding sequence. A memory 62, which may be a parallel flip-flop, is utilized to store this "old" number.

If the maximum desired change between successive random numbers is a given quantity or constant M, the control means 34 determines the difference between the old and new numbers and divides that difference by the constant M. The division is actually performed by utilizing a divider 64 during the serial to parallel conversion. Once the difference has been obtained, this difference is then added to or substracted from the "old" value which exists at the output 35 of the control means 34. Thus the output changes from an old value to a new value in increments which cannot exceed the constant M. Since this is a repetitive process, as will be seen in more detail hereinafter, the output 35 actually progresses through M-1 steps, and it is these steps which appear as the intermediate outputs 35 between successive random numbers from generator 32.

As an example of this feature, assume that the old number or output 35 was the value 64 and the new number 61 generated by the serial to parallel converter 60 is zero. If we utilize a constant M=8 the output sequence 35 starting at its "old" value of 64 would be 64, 56, 48, 40 . . . 0. Thus it may be seen that a primary random sequence from the random generator is limited by a secondary random sequence based upon a preselected constant.

The control means 34 includes two comparators 66, 68, two counters 70, 72 and a counter sequence control 74. The sequence control operates to reset and advance (increment) each counter. The output of each counter serves as an input to only one comparator. A second input to one comparator is the "old" random number; the second input to the other comparator is the "neww" number.

In operation, counters 70 and 72 are reset to zero and are counting upwards at the clock pulse rate. When the output of counter 70 matches the old number in comparator 66, as determined by the input from the memory 62, comparator 66 generates a signal indicating this match. This signal resets counter 70 through the sequence control means 74. In a similar fashion, when the new number generated from the serial to parallel converter 60 matches the value in counter 72, comparator 68 generates appropriate signal to the sequence control means 74 which operates to reset the counter 72.

At each "match" in a comparator, the signal to the counter sequence control 74 which, in turn, resets the appropriate counter, also generates a signal to the output counter 76 which permits the output counter to count up (increment) or count down (decrement) depending upon which comparator has recognized the match. The output of the counter 76 is the input to the combiner 30 (FIG. 1). In actual operation, for the values 64 and zero previously suggested, the magnitude comparator 68 will provide a match initially and that this operates the sequence control means 74 to count down. The output counter 76 will count down from the output 64 on each clock pulse until there is a match in the other magnitude comparator.

Thus, the output 35 has moved from its old value towards the new value by an amount equal to their difference divided by M. Each transition of the input signal 11 as an output 29 gates the sequence control means 74 to automatically reset each counter 70, 72 to zero and repeat the process. The process is repeated M times and, at the end of the Mth step, the output counter 76 contains a value equivalent to the "new" number appearing as the output 61.

Thus, it may be seen that the rate of change of the random number sequence is limited by the operation of the control means 34.

Figure 5:
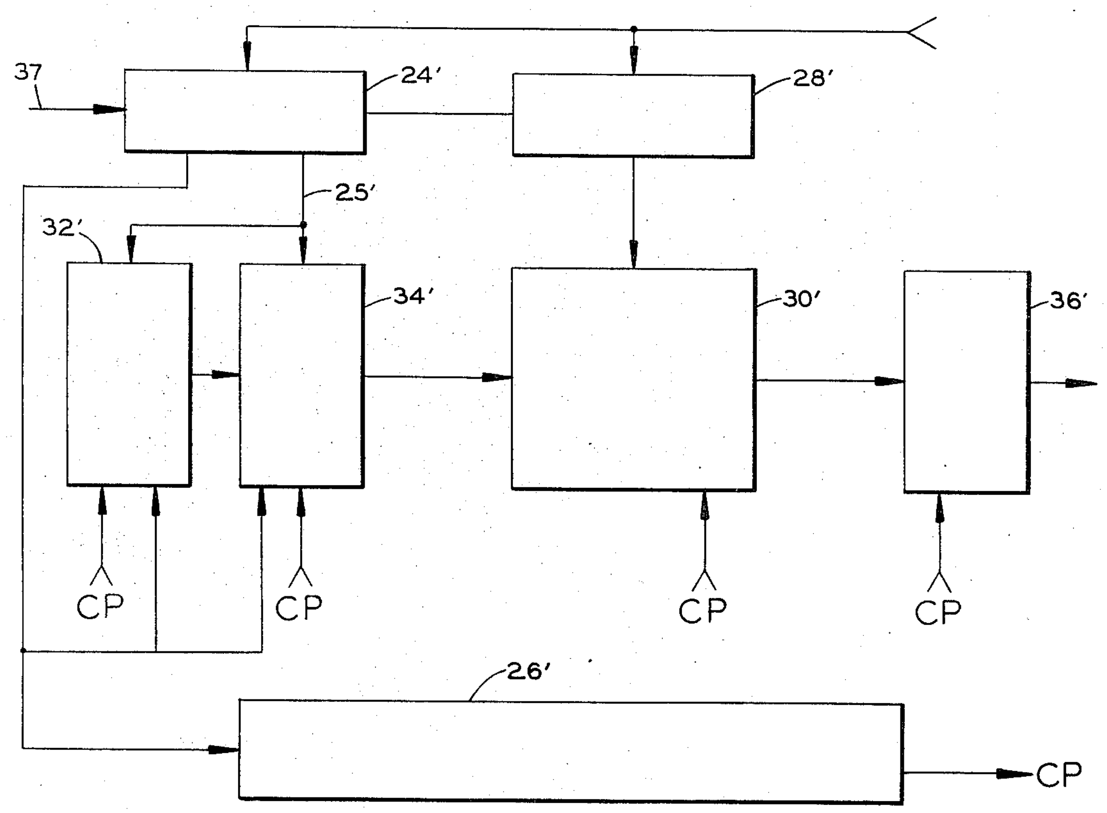
FIG. 5 is a circuit diagram, also in block form, of the unscrambler utilized at the receiving end of the communication system.

With reference next to FIG. 5, the receiving station 22 is described in block diagram form. The input 37 to the receiving station is the transmitted output 37 of the period generator means 36 from the transmitting station. Similar to the operation at the transmitting end, synchronization control means 24' operates to synchronize the input signal with its own master clock pulse CP. At each and every input signal reversal the sync control unit 24' produces an output 25' to advance the random generator 32' and the control means 34'. Thus the transmitter and the receiver random sequences are in sync relative to the initially encoded signal 11. The other components at the receiving station operate in the same fashion as those at the transmitting station and are similarly numbered for convenient reference.

The foregoing is a description of one embodiment of the present invention and, therefore, should not be read in a restrictive sense but only as describing the underlying concepts. The invention may be further developed within the scope of the following claims.

What is claimed is:

1. In a secure data transmission system including means for combining signals having random numerical values with data to scramble said data, the improvement comprising:
   control means for limiting the numerical magnitude of changes between successive random numerical value signals which are combined with data signals, and
   means for transmission of scrambled data asynchronously with changes in the combined data and random numerical value signals.

2. In an apparatus for enciphering data signals to provide secure data transmission, said apparatus including means for generating a first sequence of random signals, means responsive to successive random signals for generating a second sequence of signals, and means for combining said second sequence of signals with the data signals, the improvement which comprises:
   means responsive to the output of said combining means for asynchronously providing an enciphered output, said responsive means being operative to delay the transmission of an enciphered output for a time period based upon the value of the next successive output.

3. In an apparatus for enciphering data signals to provide secure data transmission, said apparatus including means for generating a first sequence of signals having random numerical values, the improvement which comprises:
   means responsive to successive signals of said first sequence for generating a second sequence of signals including a plurality of signals having numerical values intermediate the numerical values of successive signals in said first sequence;
   and means for combining said second sequence of signals with the data signals.

4. Apparatus according to claim 3, wherein said means for generating the second sequence of signals comprises:
   counting means;
   means for comparing the numerical total in said counting means with the numerical values of two successive signals in said first sequence;
   and additional counting means for generating said intermediate numerical value signals.

5. In an apparatus for enciphering data signals to provide secure data transmission, said apparatus including means for generating a first sequence of random signals having different numerical values, means responsive to said random signals for generating a second sequence of signals having different numerical values, and means for combining the second sequence of signals in succession numerically with the data signals, the improvement which comprises:
   means responsive to the output of said combining means for providing an enciphered output asynchronously with successive changes in the output of said combining means, said responsive means being operable by the numerical total in said combining means to determine the next time period between changes in the enciphered output.

6. Apparatus according to claim 5 wherein said responsive means, after each change in its enciphered output, samples the present numerical total in said combining means to determine accordingly the duration of the time period before the next change in its enciphered output takes place.

* * * * *